US011562094B2

(12) United States Patent
Welch et al.

(10) Patent No.: US 11,562,094 B2
(45) Date of Patent: Jan. 24, 2023

(54) GEOGRAPHY AWARE FILE DISSEMINATION

(71) Applicant: International Business Machines Corporation, Armonk, NY (US)

(72) Inventors: Steven R. Welch, Gilroy, CA (US); Sandeep Gopisetty, Morgan Hill, CA (US); Chad Eric DeLuca, Morgan Hill, CA (US); Christian B. Kau, San Jose, CA (US); Anna Lisa Gentile, San Jose, CA (US); Daniel Gruhl, San Jose, CA (US); Linda Ha Kato, San Jose, CA (US); Alfredo Alba, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 16/731,298

(22) Filed: Dec. 31, 2019

(65) Prior Publication Data

US 2021/0200891 A1 Jul. 1, 2021

(51) Int. Cl.
*G06F 21/62* (2013.01)
*G06F 16/27* (2019.01)

(52) U.S. Cl.
CPC .......... *G06F 21/6227* (2013.01); *G06F 16/27* (2019.01)

(58) Field of Classification Search
CPC .... G06F 21/6227; G06F 16/27; G06F 16/182; G06F 21/6209; G06F 2221/2111
See application file for complete search history.

(56) References Cited

U.S. PATENT DOCUMENTS

| 6,370,629 B1 | 4/2002 | Hastings et al. |
| 7,177,426 B1 | 2/2007 | Dube |
| 8,135,166 B2 | 3/2012 | Rhoads et al. |
| 8,312,064 B1 * | 11/2012 | Gauvin ............... G06F 21/6218 713/193 |

(Continued)

FOREIGN PATENT DOCUMENTS

| CN | 105975570 A | 9/2016 |
| CN | 108460121 A | 8/2018 |

(Continued)

OTHER PUBLICATIONS

Irain, M., et al., "Landmark-Based Data Location Verification in the Cloud: Review of Approaches and Challenges", Journal of Cloud Computing: Advances, Systems and Applications, (2017) 6:31, pp. 1-20, Dec. 29, 2017.

(Continued)

*Primary Examiner* — Mohammed Waliullah
(74) *Attorney, Agent, or Firm* — Lieberman & Brandsdorfer, LLC

(57) ABSTRACT

Embodiments relate to a computer system, computer program product, and method to prevent unauthorized file dissemination and replication. A file parameter is defined, with the defined file parameter including a file dissemination characteristic. The file is encoded with the defined file parameter as file metadata. Dissemination and replication of the file is managed responsive to the encoded file parameter. The defined parameter is assessed along with a physical replication destination. The file is selectively replicated or transmitted responsive to the file parameter and the destination assessment.

26 Claims, 7 Drawing Sheets

(56) References Cited

U.S. PATENT DOCUMENTS

| | | | |
|---|---|---|---|
| 8,656,454 B2 | 2/2014 | Gunawardena et al. | |
| 8,868,932 B2 | 10/2014 | Lurey et al. | |
| 9,060,004 B1 | 6/2015 | Tracy et al. | |
| 9,104,698 B2 | 8/2015 | Tysowski | |
| 9,311,499 B2 * | 4/2016 | Redlich | G06F 21/6209 |
| 9,348,845 B2 | 5/2016 | Minde et al. | |
| 10,084,828 B2 * | 9/2018 | Sorin | H04W 4/02 |
| 2012/0078643 A1 * | 3/2012 | Nagpal | G06Q 30/02 707/812 |
| 2012/0331527 A1 | 12/2012 | Walters et al. | |
| 2014/0236478 A1 | 8/2014 | Mermelstein | |
| 2017/0223119 A1 | 8/2017 | Harding | |
| 2018/0260417 A1 * | 9/2018 | Mahadevan | G06F 16/9537 |
| 2019/0068727 A1 * | 2/2019 | Wiesen | H04W 4/08 |
| 2019/0087840 A1 | 3/2019 | Zachariah et al. | |

FOREIGN PATENT DOCUMENTS

| | | |
|---|---|---|
| CN | 109040645 A | 12/2018 |
| WO | 20141187911 A1 | 8/2014 |

OTHER PUBLICATIONS

Tudoran, R., et al., "Bridging Data in the Clouds: An Environment-Aware System for Geographically Distributed Data Transfers", 14th IEEE/ACM International Symposium on Cluster, Cloud and Grid Computing, pp. 1-11, May 26-29, 2014.

Biswal, B., et al., "Classifictaion Based IP Geolocation Approach to Locate Data in the Cloud Datacenters", ASE BIGDATA/SOCIALCOM/CYBERSECURITY Conference, pp. 1-9, May 27-31, 2014.

Lozano, M. G., et al.; "Tracking Geographical Locations Using a Geo-Aware Topic Model for Analyzing Social Media Data", Decision Support Systems, vol. 99, pp. 18-29, May 15, 2017.

Kwan, M., "Protection of Geoprivacy and Accuracy of Spatial Information: How Effective are Geographical Masks?", Cartographica, vol. 39, No. 2, Summer 2004.

Gondree, M., et al., "Geolocation of Data in the Cloud", Proceedings of the Third ACM Conference on Data and Application Security and Privacy, pp. 25-36, Feb. 2013.

PCT International Search Report and Written Opinion, PCT/IB2020/062316, dated Mar. 30, 2021.

* cited by examiner

400

```
# ! /bin/bash -ex
touch foo
touch bar
getfattr -d foo
setfattr -n user.geolock -v onlyUSA ./foo
getfattr -d foo
COPYTARGET=www.ibm.com ./GeoSyncFind.pl .
COPYTARGET=www.bbc.co.uk ./GeoSyncFind.pl .
rm -f foo bat
```

402 — setfattr -n user.geolock -v onlyUSA ./foo
404 — getfattr -d foo
406

FIG. 4

GEOGRAPHY AWARE FILE DISSEMINATION

BACKGROUND

The present embodiments relate to geography aware file dissemination. More specifically, the embodiments relate to encoding a geographic designation in file metadata to manage dissemination of file data, and in one embodiment to prevent unauthorized dissemination of the file data.

It is understood in the art that there is or may be an express or inherent value to data. Cloud computing provides a venue of remote sources for data storage. Cloud based application and data are both accessible for virtually any internet-connected device. With respect to storage, users can select public, private, or hybrid storage offerings, depending on security needs and other considerations. Cloud storage allows data and files to be saved in an off-site location that can be accessed through an internet connect or a dedicated private network connection. A cloud service provider typically stores the data on multiple machines for redundancy and to support and enable continuity in the event of a disaster.

Restrictions regarding data usage are increasing at a time when cloud computing infrastructures are spanning the globe. Regulations governing data have long focused on data security and auditability, but are increasingly placing restrictions upon physical locations as well. Recent regulatory policies, such as the European Union General Data Protection Regulation, have imposed restrictions on geographical data placement. With automatic data redundancy and disaster recovery solutions being commonplace, it is important that a system understands the restrictions placed on each piece of data in deciding viable locations for data storage and backup.

SUMMARY

The embodiments described herein comprise a system, computer program product, and method for storage management of complex files.

In one aspect, a computer system is provided with a processing unit operatively coupled to memory. The processing unit and the memory are in communication with a restriction device having one or more associated tools embedded therein for management of file dissemination. The tools include a parameter manager, a dissemination manager, and a replication manager. The parameter manager functions to define a file parameter, with the defined file parameter including a file dissemination characteristic. The parameter manager encodes a file with the defined file parameter as file metadata. The dissemination manager functions to manage dissemination of the file responsive to the encoded file parameter. More specifically, the dissemination manager assesses the defined parameter in view of a physical replication destination. The replication manager functions to selectively replicate the file responsive to the file parameter and the destination assessment.

In another aspect, a computer program product is provided to manage file dissemination. The computer program product comprises a computer readable storage device having program code embodied therewith, the program code executable by a processing unit. Program code is employed to receive a file parameter, with the file parameter defining a file dissemination characteristic. The file is encoded with the received file parameter as file metadata. Program code manages dissemination of the file responsive to the encoded file parameter. More specifically, program code assesses the defined parameter in view of a physical replication destination. Program code selectively replicates the file responsive to the file parameter and the destination assessment.

In yet another aspect, a method is provided for managing file dissemination. A file parameter is defined, with the defined file parameter including a file dissemination characteristic. The file is encoded with the defined file parameter as file metadata. Dissemination of the file is managed responsive to the encoded file parameter. The defined parameter is assessed along with a physical replication destination. The file is selectively replicated responsive to the file parameter and the destination assessment.

In yet a further aspect, a method is provided for managing file data transfers. A file is encoded with a file dissemination parameter as file metadata. The encoded dissemination parameter is assessed along with a geographic location of a physical file destination to control file data transfer to the physical file destination. The file is selectively transmitted responsive to the parameter and destination assessment.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

FIG. 4 depicts an example of a shell script for an overloaded find command.

DETAILED DESCRIPTION

Figure 1:
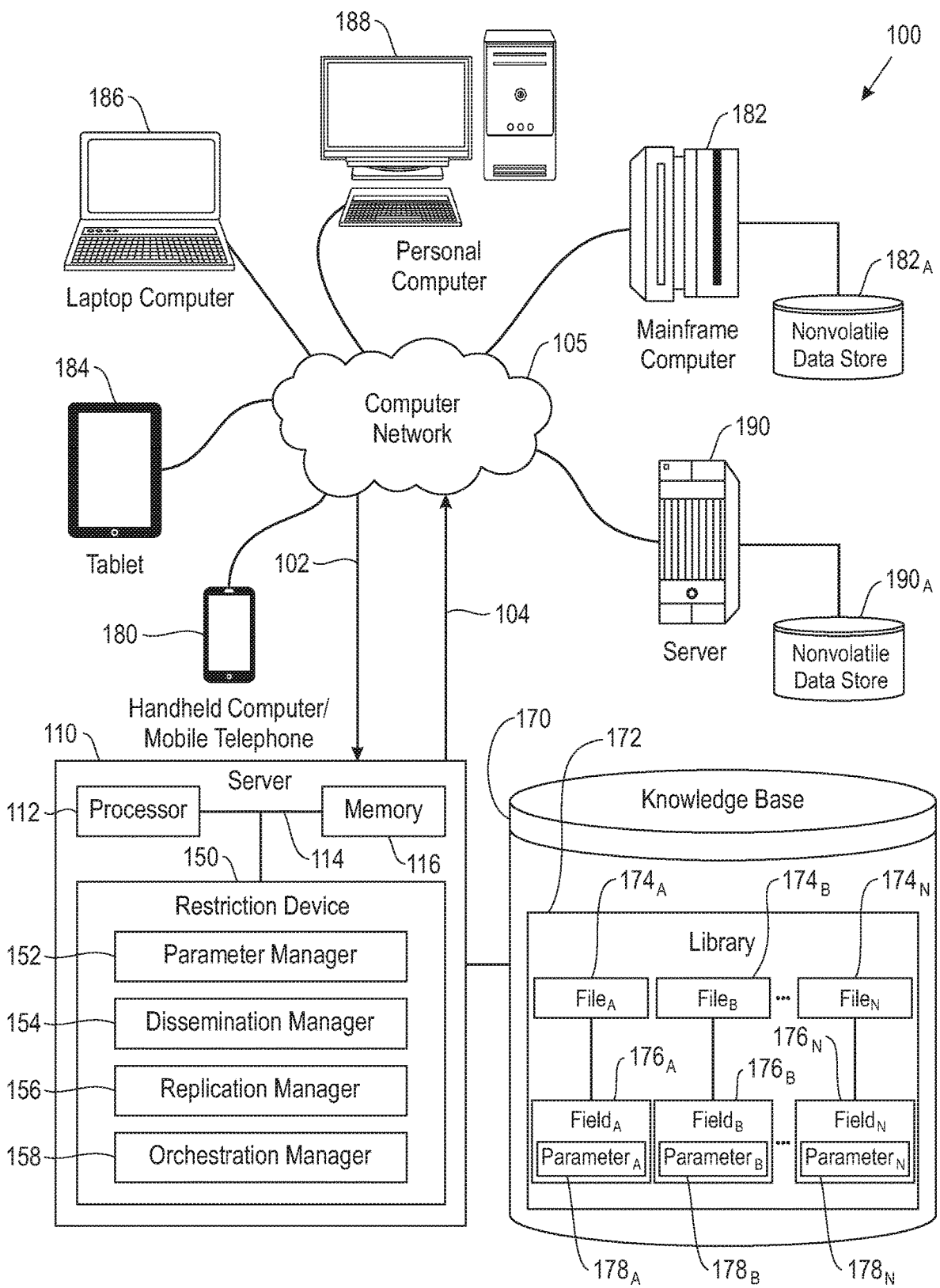
FIG. 1 depicts a block diagram illustrating an example of a computer system that supports and enables management of file replication and prevention of unauthorized file dissemination.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Restrictions and classifications placed on data, such as approved geographical locations, can be encoded in the data file via metadata. Currently there are no active mechanisms to actively enforce the restrictions and classifications encoded in the metadata. By creating restriction aware devices, certain rules can be enforced by checking the metadata of a file before an operation is executed. This approach can be used to protect against accidentally transferring data beyond approved boundaries and as well for orchestration of data movements within a hybrid cloud environment.

Extended file attributes, i.e. xattr, enable metadata to be stored with data in a way that is retrievable and understandable across environments and operating systems. Encoding geographic restrictions within the data itself, can be used to protect against accidentally transferring or replicating data beyond approved boundaries. Commands such as "setfattr" and "getfattr" (in the case of Linux) allow extended attributes, e.g. xattr, to be discovered and modified. The setfattr command associates a new value with an extended attribute name for each specified file. The getfattr command gets extended attributes for filesystem objects. An overload command allows a split in the implementation of a command that operates on different argument types into separate procedures. The extended file attributes saved in the metadata overloads a transfer command, i.e. rsync, with the added functionally from the extended attributes. If the geographic location of the transfer destination does not match or is not within the extended attributes, the transfer command is prohibited, or otherwise overloaded, by the extended attributes. Using extended file attributes to indicate geographical regions where data may reside effectively and functionally creates a restriction aware device that can enforce rules that are applied before an operation is executed on the data. Furthermore, by encoding geographic boundaries or geographic definitions in the file metadata as extended file attributes, restriction aware device(s) can protect or otherwise enforce replication or transfer of data beyond approved boundaries. In addition, the functionality of the restriction aware device may facilitate orchestration of data movements within a hybrid cloud environment. In the context of a replicated hybrid cloud environment, encoding approved geographical regions enables the restriction aware device to ensure data is automatically replicated to only the destination as defined and designated in the extended attribute(s).

The restriction aware device, also referred to herein as a restriction device, encompasses functionality to prevent or otherwise mitigate unauthorized dissemination of files and corresponding data, and is described in detail and with the associated drawing figures. The restriction device defines and encodes parameters that directly impact the dissemination into the corresponding data file. The remote command, also known as rsync, is used for copying and synchronizing files and directories remotely and locally in Linux and Unix operating systems. The find command is a Linux or Unix operating system command line utility for walking a file hierarchy. It can be used to find files and directories and perform subsequent operations on them. More specifically, the find command supports searching by file, folder, name, creation data, modification date, owner, and permissions. As shown and described herein and demonstrated in the drawing figures, the "find" and "rsync" commands are overloaded to enforce the rules defined in the extended attributes. The restriction device described in detail herein employs tools and corresponding methodology to support dissemination and replication of the data file responsive to the encoded parameters.

Referring to FIG. 1, a schematic diagram of a computing system (100) is depicted. As shown, a server (110) is provided in communication with a plurality of computing devices (180), (182), (184), (186), (188), and (190) across a network connection (105). The server (110) is configured with a processing unit (112), e.g. processor, in communication with memory (116) across a bus (114). The server (110) is shown with a restriction device (150) to support and enable file dissemination and replication over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable communication detection, recognition, and resolution. The server (110) is in operative communication with the computer network through communications links (102) and (104). Links (102) and (104) may be wired or wireless. Other embodiments of the server (110) may be used with components, systems, sub-systems, and/or devices other than those that are depicted herein.

The restriction device (150) is shown herein configured with tools to support file and corresponding data functionality, and namely to manage file replication and file dissemination, including preventing unauthorized file dissemination. The tools support and enable a data file to be encoded with specific parameters. More specifically, the tools support enforcement of dissemination and replication of the data file responsive to the encoded parameters. The tools function to implement an optimized methodology for protecting against accidental, improper, or unauthorized transfer of data with respect to defined boundaries. It is understood in the art that in one embodiment, the transfer of data may also involve the replication and copying of data in a new location. Accordingly, the restriction device (150) is configured with tools to encode a geographic designation in file metadata to manage dissemination of file data.

The tools of the restriction device (150) shown herein include, but are not limited to, a parameter manager (152), a dissemination manager (154), a replication manager (156), and an orchestration manager (158). The restriction device (150) may receive input from the network (105) and leverage a data source (170), also referred to herein as a corpus or knowledge base, to selectively encode a data file with the file parameter. As shown the data source (170) is configured with a library (172) with a plurality of files, with the files selectively encoded with file parameters. By way of example, the library (172) is shown with several files, shown herein as $file_A$ ($174_A$), $file_B$ ($174_B$), ... $file_N$ ($174_N$). Each of the files is shown with a field configured to selectively receive one or more file parameters. As shown, $file_A$ ($174_A$) includes $field_A$ ($176_A$), $file_B$ ($174_B$) includes $field_B$ ($176_B$), and file$_N$ (174$_N$) includes field$_N$ (176$_N$). Each of the fields is shown with a file parameter encoded within. As shown field$_A$ (176$_A$) includes parameter$_A$ (178$_A$), field$_B$ (176$_B$) includes parameter$_B$ (178$_B$), and field$_N$ (176$_N$) includes parameter$_N$ (178$_N$). Even though each field is shown having only one file parameter this is not to be considered limiting as each field may contain more than one file parameter. The parameter manager (152) functions to create and manage the file parameters and to selectively encode one or more library files. Details of how the file parameters are encoded in the data files are shown and described in detail below. Accordingly, the library (172) is shown local to the knowledge base (170) that is operatively coupled to the server (110) and the restriction device (150).

The parameter manager (152) functions to define a file parameter associated with a data file. The defined file parameter is a file dissemination characteristic that governs where and how a data file may be transferred or replicated. In one embodiment, the file parameter is a geographic boundary indicating where the data file can physically reside. It is understood in the art that files may be individually or collectively subject to replication and/or transfer. The parameter manager (152) selectively assigns a file parameter to the file and embeds the parameter in the corresponding file field. The parameter assignment may be amended, e.g. updated, changed, or reset by the parameter manager (152). The parameter manager (152) encodes the data file with the defined file parameter. The encoding or embedding of the file parameter may take place individually or collectively. For example, in one embodiment, the parameter manager (152) may identify a plurality of files and collectively assign and encode a specified parameter in each of the files in the collection. Accordingly, the parameter manager (152) functions to selectively assign and encode knowledge base files with dissemination parameters.

File parameters containing restrictions on how a data file can be replicated or where a data file reside are encoded in the data file as metadata. As shown in FIG. 1, the file parameters are encoded into the data file itself. More specifically, the files are individually encoded with an extended file attribute (xattr) to indicate where the data file may physically reside. The extended file attribute functions as file metadata and is stored with the file. The extended file attribute is retrievable and understandable across a plurality of environments and operating systems, i.e., Linux, Windows, MacOS, etc. By way of example, field$_A$ (176$_A$) is shown with an example extended attribute, parameter$_A$ (178$_A$). Accordingly, the parameter manager (152) functions to encode defined file parameter(s) as an extended file attribute of the data file.

The dissemination manager (154), which is shown herein operatively coupled to the parameter manager (152), functions as a tool to manage the dissemination of the data file responsive to the encoded file parameter, e.g. encoded extended attribute. The dissemination manager (154) assesses the encoded file parameter, e.g. metadata, together with the physical replication destination. In one embodiment, operating system commands such as "setfattr" and "getfattr" allow extended attributes to be discovered. The physical replication destination may be explicitly defined, or in one embodiment may be non-explicitly defined and require an evaluation to identify. For example, in one embodiment, the physical replication destination can be determined by individually or collectively using a set of global positioning system (GPS) coordinates, specific domain/internet protocol (IP) address ranges, etc. The dissemination manager (154) assesses the encoded extended attribute(s) together with the physical replication destination to determine if the extended attribute permits the data file to reside in the geographic location of the physical replication destination. In one embodiment, the dissemination manager (154) assesses the encoded extended attribute(s) together with the physical location of one or more intermediate replication destinations in addition to or in place of a final destination. Accordingly, the dissemination manager (154) interfaces with the parameter manager (152) to assess if permissive characteristics of the data file can reside in the physical replication destination based on the file parameter(s) encoded in the metadata of the data file.

The replication manager (156), shown herein as operatively coupled to both the dissemination manager (154) and the parameter manager (152), functions as a tool to selectively replicate the data file responsive to the defined file parameter(s) in the extended attribute and physical destination assessment. In one embodiment, the defined file parameter is a geographic boundary or location and the replication manager restricts file replication to a location defined within the boundary. The replication manager (156) leverages the assessment of the defined file parameter and the physical replication destination made by the dissemination manager (154) to selectively replicate the data file. For example, the replication manager (156) may enable the replication to proceed if the destination location matches or is within the parameters defined by the extended attribute. However, if the destination location does not match or is not within the defined parameters, the replication manager (156) proceeds with prohibiting or otherwise overloads the replication command, or in one embodiment may require the extended attribute to be amended or redefined in order for the replication transaction to execute. Accordingly, the replication manager (156) selectively replicates the data file responsive to the assessment performed by the dissemination manager (154).

The orchestration manager (158) is shown herein operatively coupled to the replication manager (156), the dissemination manager (154), and the parameter manager (152). The orchestration manager (158) functions as a tool to orchestrate data movement within a hybrid remote storage environment. Hybrid storage is a term used to describe a storage system that is designed with a blend of storage devices and corresponding storage categories. For example, the hybrid storage may be a storage system with a blend of flash based solid state disk and hard disk drives. With respect to remote data storage, e.g. cloud based storage, the hybrid storage may entail both local and remote resources and employing the remote resources to supplement local data storage. The hybrid storage, also referred to herein as a hybrid cloud implementation, behaves as if it is homogeneous storage, and is commonly used to facilitate backup processes and disaster recovery planning. It is understood that in the hybrid storage environment, workloads are moved between local and remote resources and that the remote resources are located at a physical location that is separate from the local resources. In other words, the local and remote resources have separate and distinct physical destinations. The orchestration manager (158) leverages the replication manager (156) and assesses the defined file parameter(s), e.g. extended attributes, saved in the metadata of the data file against the physical locations of the storage replication destinations. Upon a determination by the replication manager (156) that one or more of the physical storage replication destinations is within the boundaries of the defined file parameter encoded in the data file, the orchestration manager (158) executes movement of the replicated data to the selectively chosen data. Accordingly, the orchestration manager (158) in combination with the replication manager (156) orchestrates the movement of data within a hybrid storage environment.

The network (105) may include local network connections and remote connections in various embodiments, such that the restriction device (150) may operate in environments of any size, including local and global, e.g. the Internet. Additionally, the restriction device (150) serves as a front-end system that can make available a variety of knowledge extracted from or represented in network accessible sources and/or structured data sources. In this manner, some processes and tools populate the restriction device (150), with the restriction device (150) also including one or more input interfaces or portals to receive requests and respond accordingly.

The parameter manager (152), dissemination manager (154), replication manager (156), and orchestration manager (158), collectively referred to as restriction device tools, are shown as being embodied in or integrated within the restriction device (150) of the server (110). The restriction device tools may be implemented in a separate computing system (e.g., 190) that is connected across network (105) to the server (110). Wherever embodied, the restriction device tools function to define and encode file parameters to data files to manage file dissemination, and more specifically to prevent file dissemination to locations outside the boundaries defined in the extended attribute(s).

Types of information handling systems that can utilize the restriction device (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen or tablet computer (184), laptop or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various information handling systems or can be internal to one of the information handling systems.

The information handling system employed to support the restriction device (150) may take many forms, some of which are shown in FIG. 1. For example, the restriction device may take the form of a desktop, server, portable, laptop, notebook, or other form factor computer or data processing system. In addition, the information handling system to support the restriction device (150) may take other form factors such as a personal digital assistant (PDA), a gaming device, ATM machine, a portable telephone device, a communication device or other devices that include a processor and memory. In addition, the information handling system need not necessarily embody the north bridge/south bridge controller architecture, as it will be appreciated that other architectures may also be employed.

Figure 2:
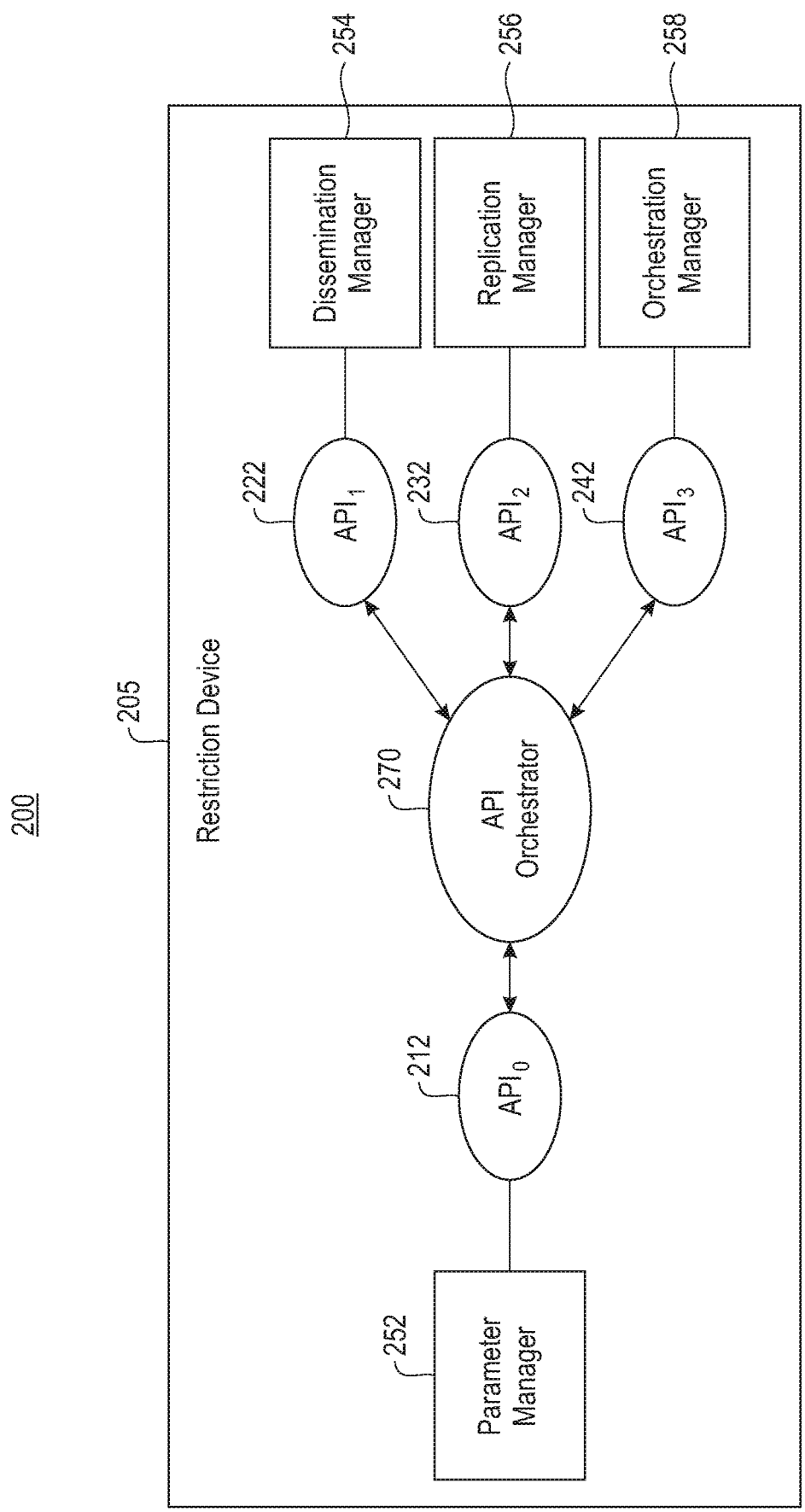
FIG. 2 depicts a block diagram illustrating the restriction device tools, as shown and described in FIG. 1, and their associated application program interfaces.

An Application Program Interface (API) is understood in the art as a software intermediary between two or more applications. With respect to the restriction device (150) shown and described in FIG. 1, one or more APIs may be utilized to support one or more of the tools (152)-(158), shown herein as tools (252)-(258), and their associated functionality. Referring to FIG. 2, a block diagram (200) is provided illustrating the tools (252)-(258) and their associated APIs. As shown, a plurality of tools is embedded within the restriction device (205), with the tools including the parameter manager (252) associated with $API_0$ (212), the dissemination manager (254) associated with $API_1$ (222), the replication manager (256) associated with $API_2$ (232), and orchestration manager (258) associated with $API_3$ (242).

Each of the APIs may be implemented in one or more languages and interface specifications. $API_0$ (212) provides functional support to selectively assign and encode knowledge base files with dissemination parameters; $API_1$ (222) provides functional support to assess if permissive characteristics of the data file can reside in a physical replication destination based on the file parameter(s) encoded in the metadata of the data file; $API_2$ (232) provides functional support to selectively replicate the data file responsive to the assessment; and $API_3$ (242) provides functional support to orchestrate the movement of data within a hybrid storage environment. As shown, each of the APIs (212), (222), (232), and (242) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
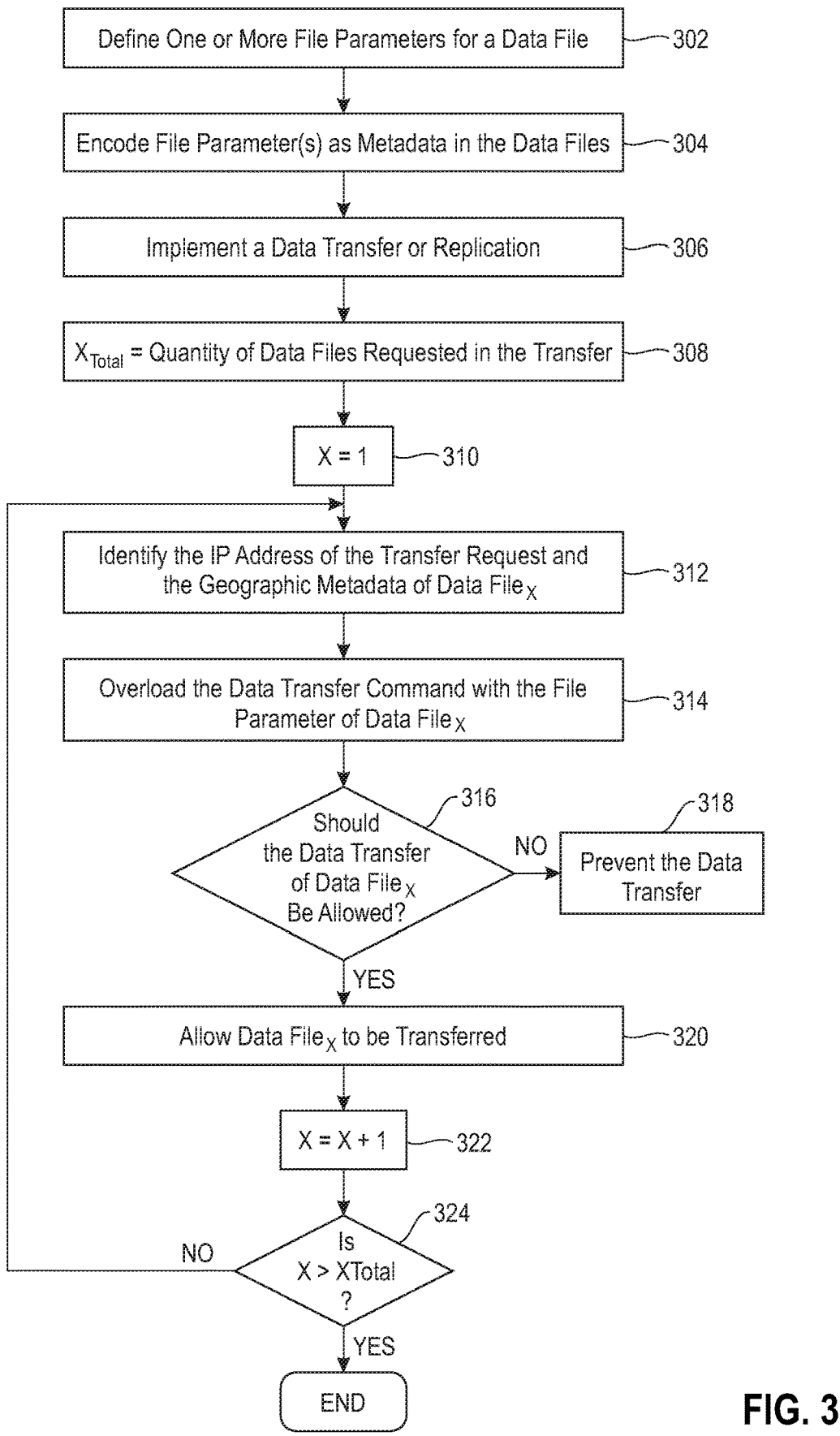
FIG. 3 depicts a flow chart illustrating a process for encoding geographic characteristic(s) within the file and using extended file attributes to manage data dissemination.

Referring to FIG. 3, a flow chart (300) is provided illustrating a process for encoding geographic restrictions within the data using extended file attributes to manage data dissemination. One or more file parameter(s) are defined for a data file (302). The defined file parameter is a file dissemination characteristic that governs where a data file may be transferred or replicated. In one embodiment, the file parameter is a geographic designation indicating where the data file can physically reside. For example, it is understood that a file subject to transmission may 'hop' across locations before it arrives at a destination location. In this case, the file parameter is directed at dissemination of the file to the destination and not at the locations subject to the hopping. The file parameters from step (302) are encoded as metadata in a file extended attribute, i.e. xattr, (304). The extended file attribute enables metadata to be stored in a way that is retrievable and understandable across environments and operating systems, i.e., Linux, Windows, MacOS, etc. In one embodiment, the file parameters can are saved as metadata in the extended attributes of each data file. In one embodiment the geographic designations of file data are automatically encoded in the extended file attributes as metadata. In one embodiment, the geographic designation is not permanent and can be changed at a future time by amending the file parameter saved in the file metadata. Accordingly, file parameters are defined and encoded as metadata to the extended attributes of a data file.

Following encoding the metadata of the data file at step (304), a data file is subject to replication and transmission to a destination location different from the originating location (306). In one embodiment, the data replication is automatically implemented. The variable $X_{Total}$ is assigned to represent the quantity of data files requested to be replicated (308) and a corresponding data file counting variable, X, is initialized (310). An operating system (O/S) command, such as rsync, identifies the Internet protocol (IP) address of the replication destination request and the geographic metadata of data file$_X$ requested by the transfer (312). The file parameter(s) metadata saved in the extended file attributes of data file$_X$ overloads the transfer command, i.e. rsync, with the added functionally (314). A determination is then made whether to allow the replicated data file$_X$ to be transmitted to the designated destination location (316). The determination at step (316) involves comparing the geographic designation in the extended file attribute of data file$_X$ with the geographic location associated with the IP address. In one embodiment, the determination at step (316) might involve comparing the geographic designation in the extended file attributes with the geographic location associated with the IP address of one or more intermediate replication locations in addition to or in place of a final replication destination. Accordingly, the file parameter(s) in the extended file attributes of the data file overloads the data transfer command and a determination is made if the geographic designation in the file parameter matches the geographic location of the IP address that the request was sent from.

If at step (316) it is determined that the geographic location of the IP address is not within the boundary defined by the extended file attribute, the transfer of the data file$_X$ will not take place (318). However, if at step (316) it is determined that the IP address is within the boundary defined by the extended file attribute, then data file$_X$ will be subject to transmission (320). Following either step (318) or (320) the data file counting variable, X, is incremented (322) and a determination is made if all of the requested or identified data files have been evaluated (324). A negative response to step (324) returns the process to step (312) for evaluation of the next data file. A positive response to step (324) indicates that all of the requested data files have been evaluated and the process ends.

In one embodiment, the operating command at step (312) is directed at replication of the data file within a hybrid storage environment having two or more physical storage replication destinations. Similar to step (310), the added functionality of the geographic metadata extends the replication command and a determination is made if the geographic metadata matches the physical boundary defined by the geographic location of the storage replication destination. The desired geographic storage location for the data file might be subject to change over time. In one embodiment, the geographic metadata is amended when the geographic storage location of the data file changes. If the geographic location matches the metadata then the replication command will allow the copying of the data file to proceed. Accordingly, the geographic designation metadata encoded in the data file prevents the data file from being transferred or replicated to a location not indicated by the metadata.

As shown and described in FIGS. 1-3, the restriction device (150) provides a solution directed at encoding geographic restrictions within the data itself, and using the extended file attributes to indicate geographical regions where the data may reside. The process shown in FIG. 3 illustrates enforcement and application of the restriction device (150) before an operation is executed on the subject data. Accordingly, encoding approved geographies in extended attributes is used to protect against transferring data beyond approved boundaries, as well as for the orchestration of data movements within a hybrid cloud environment.

Referring to FIG. 4, an example shell script (400) for an overloaded find command is shown where extended file attributes, as shown and described herein, enable metadata to be stored with data in a manner that is retrievable and understandable across environments and operating system. Several commands to interface with the extended attributes are supported, and in one embodiment may vary depending on the operating system. The shell script shown herein is for a Linux operating system. In one embodiment, the shell script may be amended to support script language for a different operating system. For example, in the Linux operating system as shown in FIG. 4, the command setfattr may be utilized to establish or amend the attribute(s) (402), and the command getfattr may be utilized to discover an established attribute (404). For example, the following command can be used to restrict a file called "foo" to geographies within the United States: sefattr—n user.geolock—v only USA./foo (406). The command(s) for encoding the attribute(s) and the command(s) for discovering the encoded attribute(s) within a file ensure standard file commands respect the encoding.

It is understood that data of different types may be stored on a volume, and that the volume may be subject to replication at a target destination. The encoding of the extended attribute and enforcement of the encoding ensures the data is replicated to the appropriate target destination(s) without violating data regulations, which may vary from file to file. The encoding and enforcement disclosed herein targets servers and prevents the transfer of the data by using metadata on the file rather than file annotation.

As shown and described in FIGS. 1-4, geographic restrictions are encoded within the data itself, and commands are utilized to interface with the encoded file attributes control dissemination of the data in compliance with the encoded restrictions. Aspects of the tools, e.g. (152)-(158), and their associated functionality may be embodied in a computer system/server in a single location, or in one embodiment, may be configured in a cloud based system sharing computing resources. Similarly, the encoded data may be disseminated to one or more locations through the cloud based system sharing computing resources. With references to FIG. 5, a block diagram (500) is provided illustrating an example of a computer system/server (502), hereinafter referred to as a host (502) of a cloud based support system, to implement the system and processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
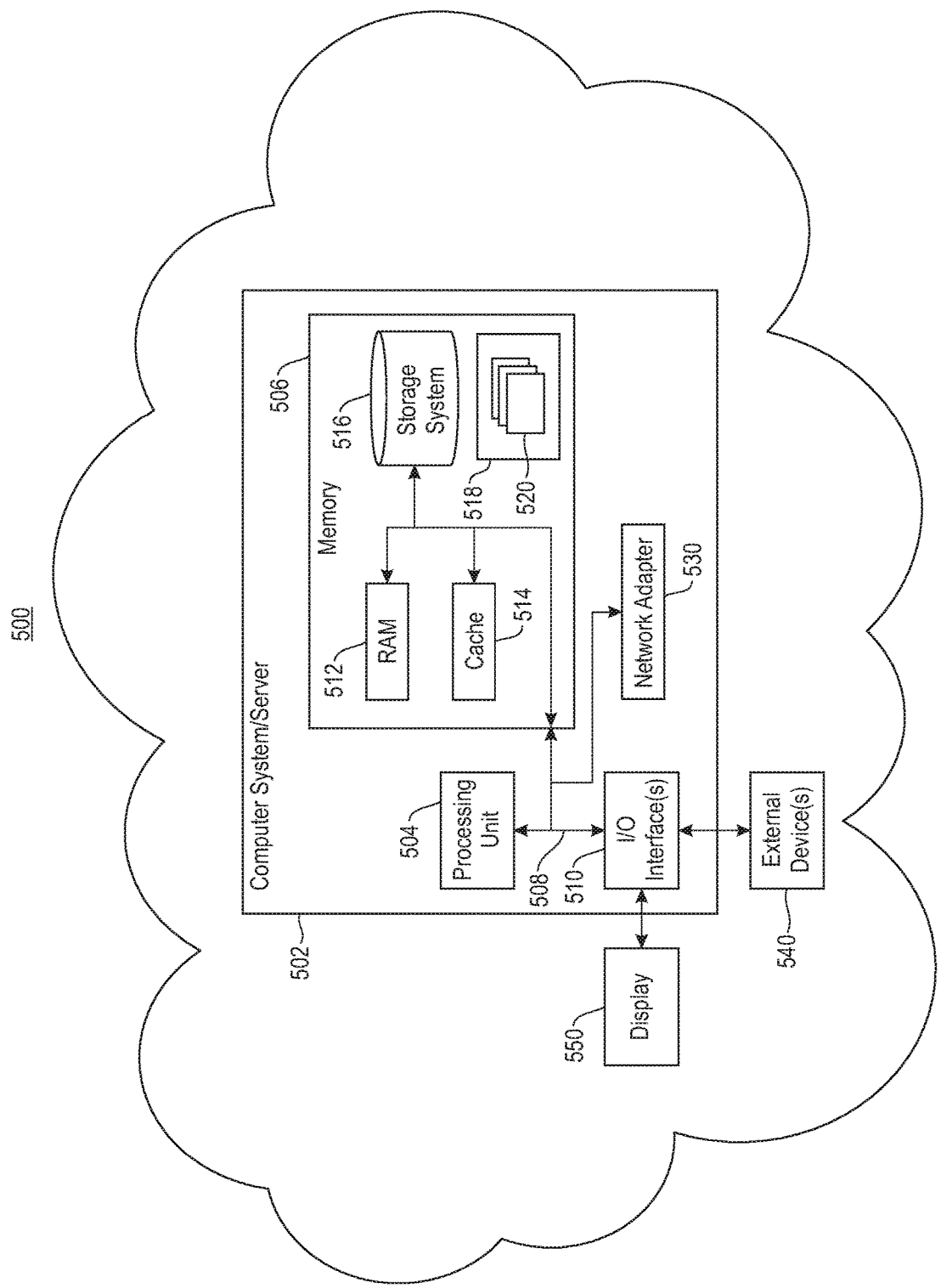
FIG. 5 depicts a schematic example of a system to implement the process shown and described in FIGS. 1-4.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (512) and/or cache memory (514). By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments of file decomposition and associated reassembly as described herein. For example, the set of program modules (520) may include the modules configured to implement management of dissemination of file data, and in one embodiment to prevention of unauthorized dissemination of the file data, as described above with reference to FIGS. 1-4.

Host (502) may also communicate with one or more external devices (540), such as a keyboard, a pointing device, etc.; a display (550); one or more devices that enable a user to interact with host (502); and/or any devices (e.g., network card, modem, etc.) that enable host (502) to communicate with one or more other computing devices. Such communication can occur via Input/Output (I/O) interface(s) (510). Still yet, host (502) can communicate with one or more networks such as a local area network (LAN), a general wide area network (WAN), and/or a public network (e.g., the Internet) via network adapter (530). As depicted, network adapter (530) communicates with the other components of host (502) via bus (508). In one embodiment, a plurality of nodes of a distributed file system (not shown) is in communication with the host (502) via the I/O interface (510) or via the network adapter (530). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (512), cache (514), and storage system (516), such as a removable storage drive and a hard disk installed in a hard disk drive.

Computer programs (also called computer control logic) are stored in memory (506). Computer programs may also be received via a communication interface, such as network adapter (530). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
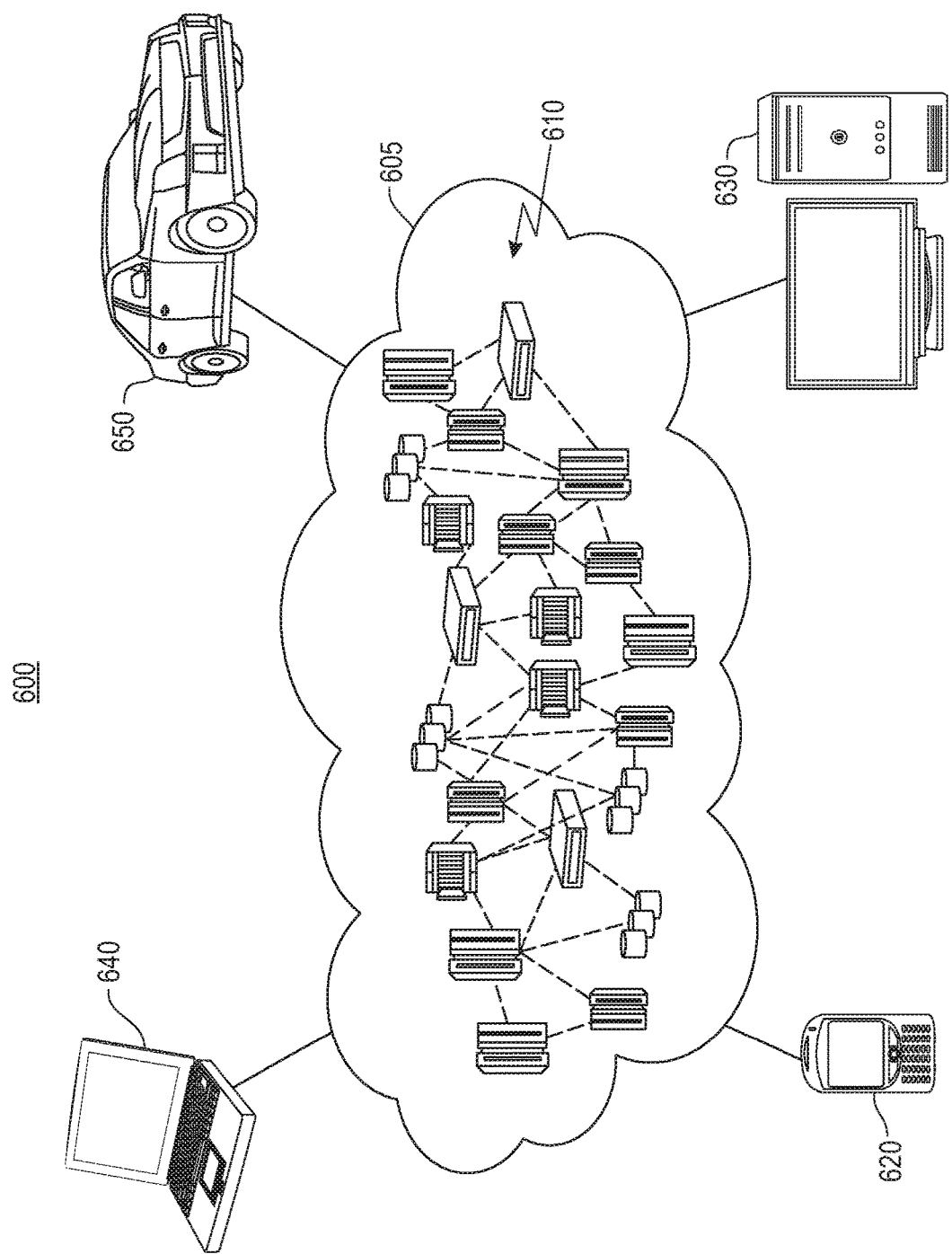
FIG. 6 depicts a block diagram illustrating a cloud computing environment.

Referring now to FIG. 6, an illustrative cloud computing network (600). As shown, cloud computing network (600) includes a cloud computing environment (605) having one or more cloud computing nodes (610) with which local computing devices used by cloud consumers may communicate. Examples of these local computing devices include, but are not limited to, personal digital assistant (PDA) or cellular telephone (620), desktop computer (630), laptop computer (640), and/or automobile computer system (650). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (620)-(650) shown in FIG. 6 are intended to be illustrative only and that the cloud computing environment (605) can communicate with any type of computerized device over any type of network and/or network addressable connection (e.g., using a web browser).

Figure 7:
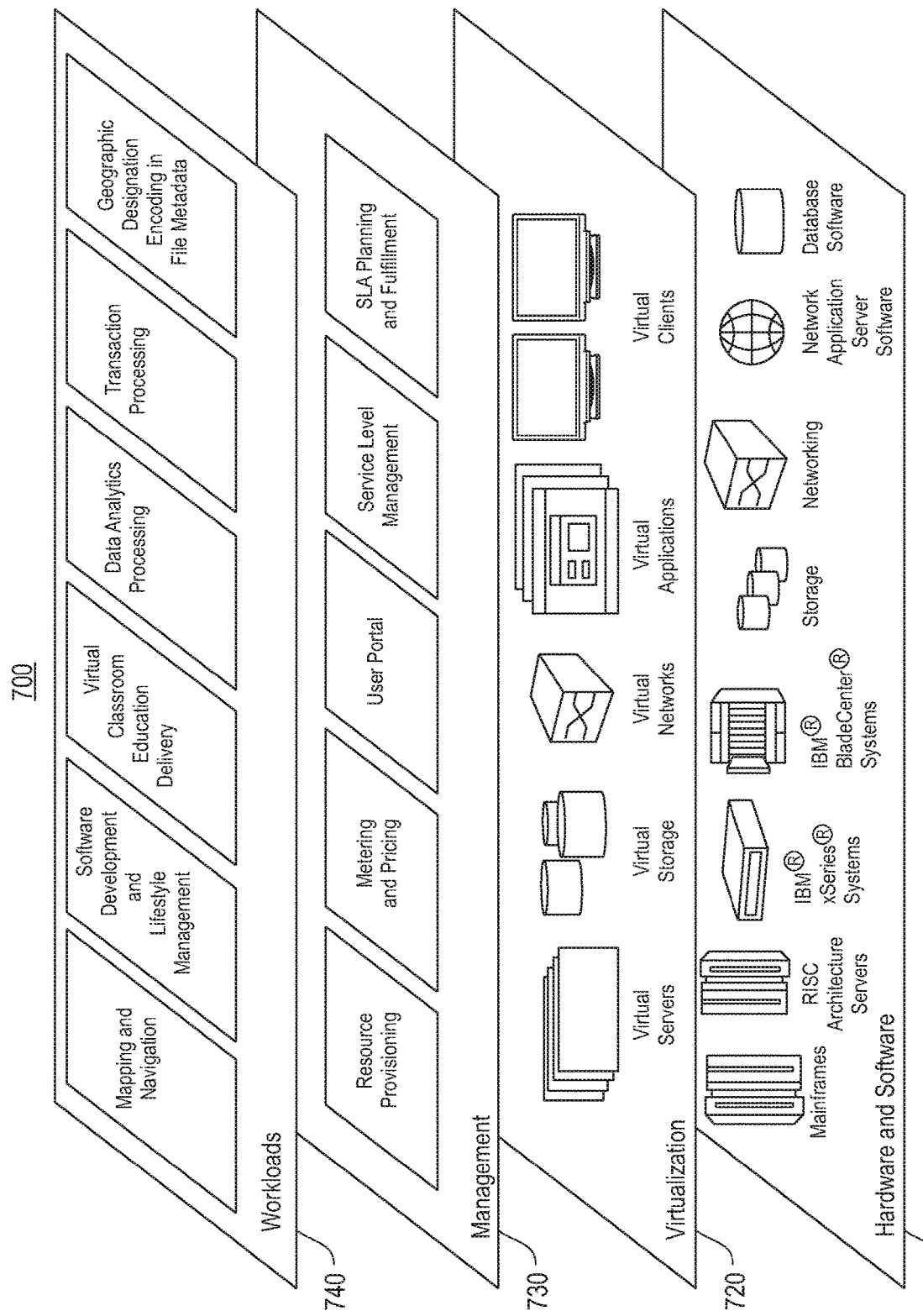
FIG. 7 depicts a block diagram illustrating a set of functional abstraction model layers provided by the cloud computing environment.

Referring now to FIG. 7, a set of functional abstraction layers provided by the cloud computing network of FIG. 5 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and geographic designation encoding in file metadata.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments with various modifications as are suited to the particular use contemplated. Accordingly, the decomposition and associated file composition recognizes multiple file formats at a file system layer and efficiently utilizes the characteristics of the associated storage array.

It will be appreciated that, although specific embodiments have been described herein for purposes of illustration, various modifications may be made without departing from the spirit and scope of the embodiments. The control of the file dissemination may be modified to include an intermediate location in addition to or in place of a final destination. Accordingly, the scope of protection of these embodiments is limited only by the following claims and their equivalents.

What is claimed is:

1. A computer system comprising:
   a processing unit operatively coupled to memory; and
   a restriction device in communication with the processing unit having tools to support selective file dissemination, the tools comprising;

a parameter manager configured to define a file parameter, the defined file parameter including a file dissemination characteristic;

the parameter manager configured to encode a file with the defined file parameter as file metadata;

a dissemination manager configured to:

manage dissemination of the file responsive to the encoded file parameter, including to assess the defined file parameter and a physical replication destination;

identify an intermediate file location associated with the file dissemination characteristic; and assess the intermediate file location in view of the defined file parameter; and a replication manager configured to:

selectively replicate the file responsive to the defined file parameter and destination assessment; and selectively transmit the file responsive to the intermediate file location assessment.

2. The computer system of claim 1, further comprising an orchestration manager configured to orchestrate data movement within a hybrid remote storage environment having two or more physical storage replication destinations;

wherein the selective replication of the file responsive to the encoded file parameter further comprises the replication manager configured to separately assess the defined file parameter against each of the two or more physical storage replication destinations.

3. The computer system of claim 1, wherein the defined file parameter is a geographic boundary, and wherein the replication manager is configured to restrict file replication to a location defined within the geographic boundary.

4. The computer system of claim 3, wherein the defined file parameter is a destination IP address associated with the replication.

5. The computer system of claim 1, wherein the parameter manager is configured to reset the defined file parameter, including to amend the file parameter and encode the amended file parameter as file metadata.

6. The computer system of claim 1, wherein encoding the file with the defined file parameter integrates file dissemination control data directly with the file.

7. A computer program product for selective file dissemination, the computer program product comprising:

a computer readable storage device having program code embodied therewith, the program code executable by a processor to:

define a file parameter, the defined file parameter including a file dissemination characteristic;

encode a file with the defined file parameter as file metadata;

manage dissemination of the file responsive to the encoded filed parameter, including assessing the defined file parameter and a physical replication destination;

selectively replicate the file responsive to the defined file parameter and destination assessment;

identify an intermediate file location associated with the file dissemination;

assess the intermediate file location in view of the defined file parameter; and selectively transmit the file responsive to the intermediate file location assessment.

8. The computer program product of claim 7, further comprising program code executable by the processor to:

orchestrate data movement within a hybrid remote storage environment having two or more physical storage replication destinations; and separately assess the defined file parameter against each of the two or more physical storage replication destinations.

9. The computer program product of claim 7, wherein the defined file parameter is a geographic boundary, and further comprising program code executable by the processor to restrict file replication to a location defined within the geographic boundary.

10. The computer program product of claim 9, wherein the defined file parameter is a destination IP address associated with the replication.

11. The computer program product of claim 7, further comprising program code executable by the processor to reset the defined file parameter, including to amend the defined file parameter and encode the amended file parameter as file metadata.

12. The computer program product of claim 7, wherein the encoding the file with the defined file parameter integrates file dissemination control data directly with the file.

13. A method comprising:

defining a file parameter, the defined file parameter including a file dissemination characteristic;

encoding a file with the defined file parameter as file metadata;

managing dissemination of the file responsive to the encoded file parameter, including assessing the defined file parameter and a physical replication destination;

selectively replicating the file responsive to the defined file parameter and destination assessment;

identifying an intermediate file location associated with the file dissemination;

assessing the intermediate file location in view of the defined file parameter; and selectively transmitting the file responsive to the intermediate file location assessment.

14. The method of claim 13, further comprising orchestrating data movement within a hybrid remote storage environment having two or more physical storage replication destinations, wherein the selective replication further comprises separately assessing the defined file parameter against each of the two or more physical storage replication destinations.

15. The method of claim 13, wherein the defined file parameter is a geographic boundary, and further comprising restricting file replication to a location defined within the geographic boundary.

16. The method of claim 15, wherein the defined file parameter is a destination IP address associated with the replication.

17. The method of claim 13, further comprising resetting the defined file parameter, including amending the defined file parameter and encoding the amended parameter as file metadata.

18. The method of claim 13, wherein encoding the file with the defined file parameter integrates file dissemination control data directly with the file.

19. A method comprising:

encoding a file with a file dissemination parameter as file metadata;

using the encoded file dissemination parameter to control file data transfer to a physical file destination, including:

assessing the file dissemination parameter and a geographic location of the physical file destination;
identifying an intermediate file location associated with the transfer; and
assessing the intermediate file location in view of the file dissemination parameter; and
selectively transmitting the file responsive to the intermediate file location assessment.

20. The method of claim 19, further comprising orchestrating data movement within a hybrid remote storage environment having two or more physical file destinations, wherein the selective transmission further comprises separately assessing the encoded file dissemination parameter against each of the two or more physical file destinations.

21. The method of claim 19, wherein the encoded file dissemination parameter is a geographic boundary, and further comprising restricting file transmission to a location defined within the geographic boundary.

22. The method of claim 21, wherein the encoded file dissemination parameter is a destination IP address associated with the transmission.

23. The method of claim 19, further comprising resetting the file dissemination parameter, including amending the encoded file dissemination parameter and encoding the amended file dissemination parameter as file metadata.

24. The method of claim 19, wherein encoding the file with the file dissemination parameter integrates file dissemination control data directly with the file.

25. A method comprising:
encoding a file with an extended file attribute as file metadata, the extended file attribute indicating a location where the file is permitted to reside;
using the encoded extended file attribute to control file data transfer to a physical file destination, including:
assessing the encoded extended attribute and a geographic location of the physical file destination;
identifying an intermediate file location associated with the transfer; and
assessing the intermediate file location in view of the extended file attribute;
selectively transmitting the file responsive to the encoded extended attribute and destination assessment; and
selectively transmitting the file responsive to the intermediate file location assessment.

26. The method of claim 25, wherein the extended file attribute is retrievable and understandable across a plurality of environments or operating systems.

* * * * *